United States Patent [19]
Chien

[11] Patent Number: 6,011,753
[45] Date of Patent: Jan. 4, 2000

[54] CONTROL AND MONITORING OF DEVICES EXTERNAL TO A MARINE SEISMIC STREAMER

[75] Inventor: Loring C. Chien, Katy, Tex.

[73] Assignee: Syntron, Inc., Houston, Tex.

[21] Appl. No.: 09/044,740

[22] Filed: Mar. 19, 1998

[51] Int. Cl.[7] .................................................. G01V 1/22
[52] U.S. Cl. .............................. 367/21; 367/76; 181/110
[58] Field of Search .................................. 367/15, 16, 76, 367/21, 79, 78, 18, 20, 80; 340/854.1; 181/110, 112

[56] References Cited

U.S. PATENT DOCUMENTS

| | | | |
|---|---|---|---|
| 4,709,355 | 11/1987 | Woods et al. | 367/16 |
| 4,967,400 | 10/1990 | Woods | 367/21 |
| 5,058,080 | 10/1991 | Siems et al. | 367/79 |
| 5,631,874 | 5/1997 | Mastin et al. | 367/15 |

*Primary Examiner*—Christine Oda
*Assistant Examiner*—Anthony Jolly
*Attorney, Agent, or Firm*—Gunn & Associates, P.C.

[57] ABSTRACT

A technique and a system provide control and monitoring of devices external to a marine seismic streamer by segmenting the conductor to which the external devices are coupled. The module which connects sections of the seismic data telemetry cable is modified to include a switch. The switch is controlled by a command signal on the seismic data telemetry cable to segment the twisted pair bus into a plurality of dedicated busses, each dedicated to a subset of the external devices, such as one or two such devices. In this way, the external devices can be communicated with in parallel, rather than in series as in conventional systems.

18 Claims, 4 Drawing Sheets

(NORMAL MODE)

(ENHANCED MODE)

CONTROL AND MONITORING OF DEVICES EXTERNAL TO A MARINE SEISMIC STREAMER

FIELD OF THE INVENTION

The present invention relates generally to the field of marine seismic acquisition systems and, more particularly, to the control and monitoring of devices associated with or coupled to a marine seismic streamer, including cable levelers, heading indicators, and acoustic echo-locating positioning equipment.

BACKGROUND OF THE INVENTION

In marine seismic exploration, a vessel tows acoustic sources and one or more hydrophones arrayed in a streamer. Various heading sensors are also included, generally within or associated with one or more cable levelers. Each of the devices is connected to but external to the streamer through a magnetic coil type coupling, which allows free rotation of the external devices and waterproof connections.

The streamer, along with strength members, hydrophones, couplings, and other components, includes a high data rate conductor for carrying seismic and telemetry data. This high data rate conductor is generally connected in lengths of about 150 meters by a series of modules, which among other functions ensures the amplitude and fidelity of the data. The streamer also includes a low data rate communications conductor, referred to herein as a twisted pair bus, for command and control of the various external devices. As used herein, the twisted pair bus may also be referred to as the control conductor. Magnetic coils for communicating with external devices are connected directly to this bus.

The modules previously referred to serve as repeaters and amplifiers for the high data rate seismic and telemetry data being carried by the high data rate conductor. The twisted pair bus also passes through each of the modules, but in known systems the twisted pair bus has no connections to any other components within each module through which it passes.

This system of streamer high and low speed data conductors has proved effective in conducting seismic surveys but it suffers a number of drawbacks. For example, since the twisted pair bus is one long continuous conductor from the vessel to the end of the streamer, external devices coupled to the streamer must be communicated with in series. This significantly slows the process of querying and commanding the external devices. Also, if one of the external devices develops a fault, such as a short circuit, then the entire external communications system is generally out of commission and the streamer must be retrieved to isolate the fault, and then fault isolation can be a tedious undertaking.

The long, relatively low speed communications lines in the streamer, due to their length, limit the data bandwidth. Furthermore, as a signal is conducted along this communication channel, which is often thousands of meters long, signal strength decreases. The length of the twisted pair bus also has a direct, detrimental effect of the useful life of the charge of batteries in some of the external devices, because they must put out a high power signal in order to be able to communicate from the very end of the streamer.

Sea water in-leakage is also an all too common problem with seismic streamers as they are towed behind a vessel. Minor damage to the skin around the streamer components may develop leaks which permit sea water to invade the streamer when it is towed at depth. Even a minor electrical ground in a portion of the twisted pair bus will ground the entire length of the bus, since the bus is one continuous conductor in known systems. This characteristic also makes it very difficult to pinpoint the location of such a fault in the streamer for diagnostics and repair.

Thus, there remains a need for a way to isolate each of the external devices connected to a streamer so that each can be queried and commanded in parallel, and so that a fault in an external device can be isolated from the rest of the streamer.

SUMMARY OF THE INVENTION

The present invention addresses these and other drawbacks of the prior art by providing a technique and a system to segment the conductor to which the external devices are coupled. The module which connects sections of the seismic data telemetry cable is modified to include a switch. The switch is controlled by a command signal on the seismic data telemetry cable and, on loss of power, the switch fails to a position for operation in the conventional mode. In other words, on a loss of power, the switch provides a default position to permit continued standard operation of the system.

Upon a command to operate in an enhanced mode, the switch is positioned so that the external device control conductor is segmented into a series of dedicated busses, each bus dedicated to a specific module. A modem is provided in each module to serialize data to the external devices and to multiplex data into parallel (i.e., byte) form for communication over the module's high speed data links to the vessel or other receiver.

In this way, all of the external devices coupled to the streamer can be addressed and heard in parallel, rather than each in turn. This system also provides the capability of isolating faults within the streamer. Further, the enhanced capabilities can be exploited for systems with the data handling capability, while continuing to operate with systems of the conventional form. The present invention is applicable to seismic cables in general, including land-based, ocean bottom, and streamer cables, but is preferably adapted for marine seismic streamers.

These and other features of the present invention will be apparent to those of skill in the art from a review of the following detailed description along with the accompanying drawings.

DETAILED DESCRIPTION OF A PREFERRED EMBODIMENT

Figure 1:
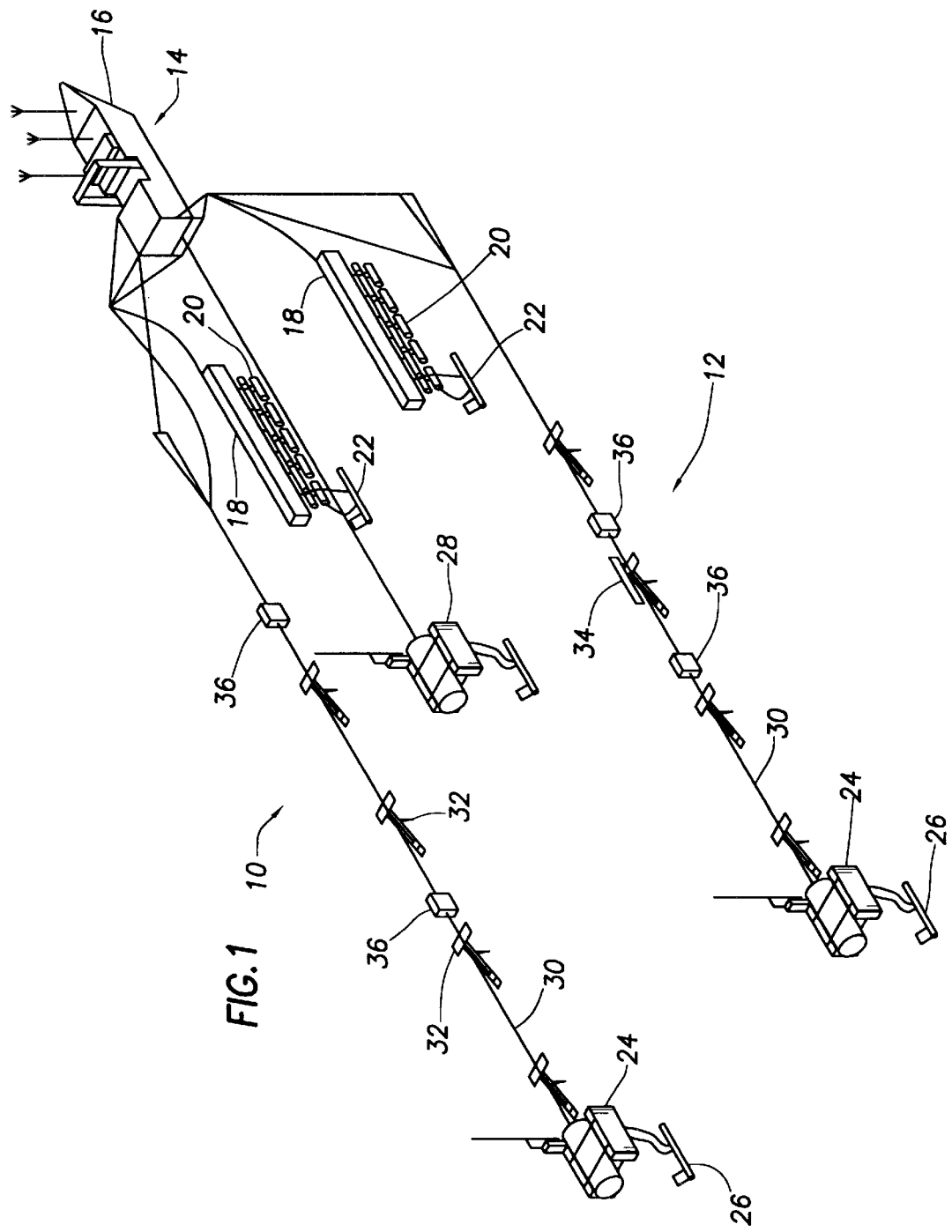
FIG. 1 depicts a sea-going water craft towing a marine seismic system.

The system depicted in FIG. 1 is a data acquisition and control system 10 designed for marine seismic operations. The system's modular design provides the user with an integrated control and position system that can be customized to meet the particular needs of each survey. The system comprises a shipboard controller 14 aboard a vessel 16 and in-water remote units 12.

The in-water remote units 12 include air gun arrays 18, which may be of many well known types. Accompanying each gun array 18 is a set of gun acoustic units 20 and associated tow fish acoustic units 22 deployed below. The system also includes a tail buoy 24 and an associated tow fish acoustic unit 26 at the end of each streamer 30, for example.

The system may also include a tow buoy 28 and either a gun acoustics unit or a surface mount unit. The gun acoustics unit provides precise location of the seismic energy source relative to a fixed reference point, while the surface mount acoustic unit is used in locations where the use of streamer-mounted remote units would be impractical.

Spaced along each streamer is a plurality of depth control devices 32, commonly referred to a birds. A depth control device 32 may also include a float tube 34 attached to it.

As used in this disclosure, each of the devices along the streamers which require communication with the boat through the streamer are referred to collectively as external devices. Each of the external devices is coupled to the streamer by a known electromagnetic coil arrangement to control and monitoring.

Also spaced along each streamer is a set of modules 36. The modules provide coupling for high data rate transmission of seismic data and telemetry accumulated by the appropriate external devices. The modules also serve as mechanical support for relatively low data rate conductors for control and monitoring of other appropriate external devices, although the low data rate conductors in known systems do not communicate with other components within the modules. In the present invention, however, the low data rate conductors are connected through switches within the modules 36, as shown and described below.

Figure 2:
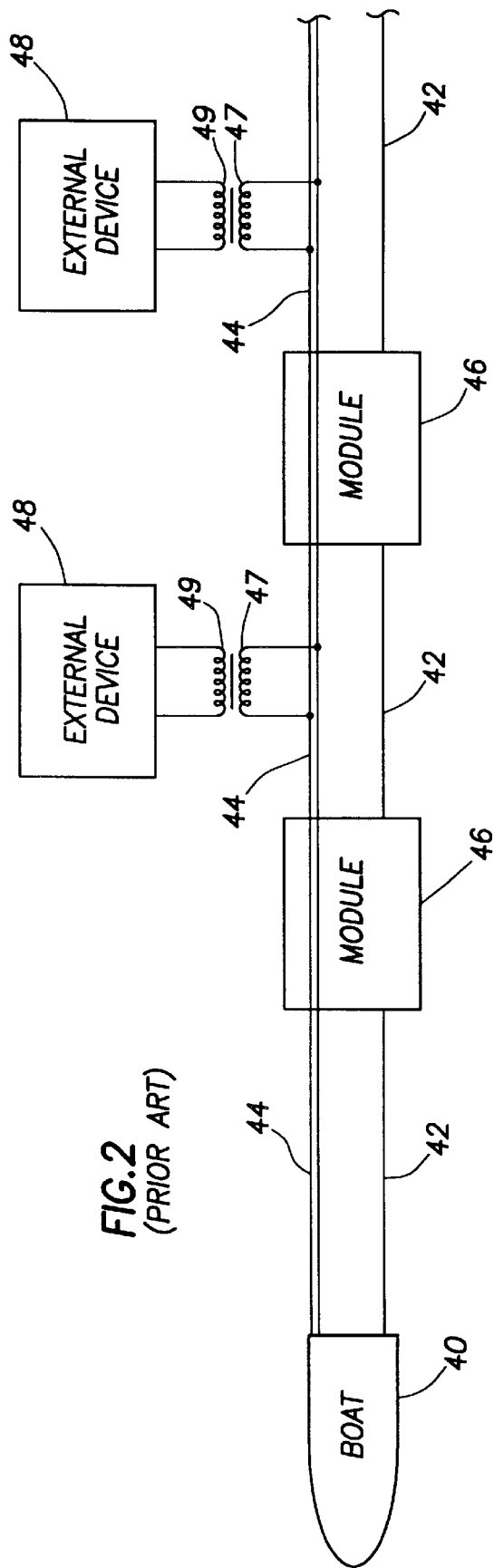
FIG. 2 provides additional details of a prior art seismic streamer.

FIG. 2 depicts a known seismic streamer communication system. The vessel or boat 40 controls both the seismic acquisition streamer electronics and the external devices. Each of the external devices terminates independently into one or more systems for communication with the boat 40. Seismic data telemetry 42 has no signal connections to the external device system twisted pair signal bus 44. Modules 46 are located at intervals alone the cable for seismic acquisition surveys.

Figure 3:
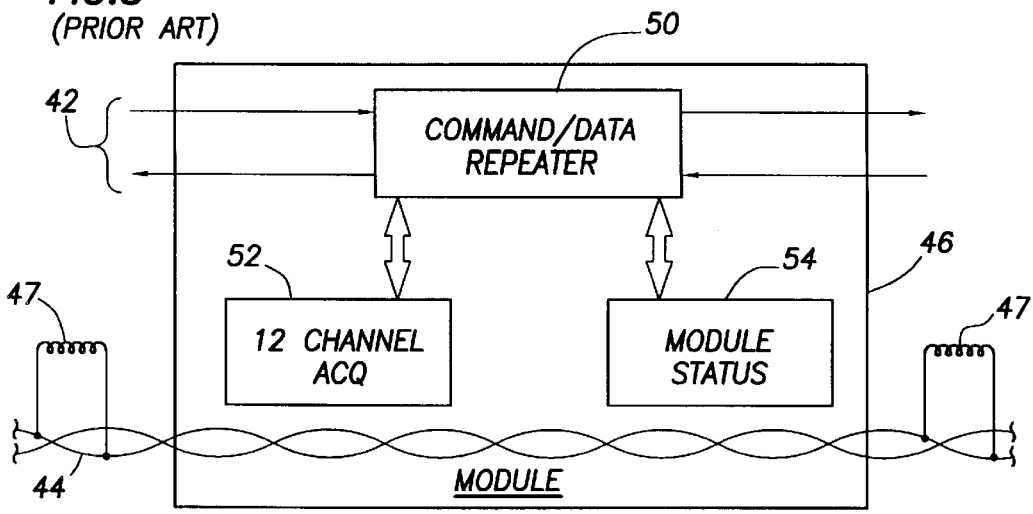
FIG. 3 is a simplified schematic drawing of a prior art module within the seismic streamer.

One such known module 46 is shown in great detail in FIG. 3. The seismic data telemetry lines 42 provide bi-directional communication to a command/data repeater 50 within the module. The module 46 also includes internal devices 52 and 54 for internal operation of the module. Particularly noteworthy in connections to the module 46 is the fact that the twisted pair bus 44 passes straight through the module 46 with no internal connections within the module.

As shown in FIGS. 2 and 3, communications coils 47 pass signals from the twisted pair bus 44 to a corresponding coil 49 that are part of an external device 48. In a conventional streamer cable, 20–60 modules may be positioned every 150 meters apart, for example. The cable sections that contain the seismic data telemetry wires 42 and the twisted pair bus 44 and coil 47 are provided with connectors (not shown) and are modular for easy maintenance.

The communications channels on the twisted pair bus 44 commonly use modulation schemes such as frequency shift keying (FSK) in known systems. Carrier frequencies are in the range of 27 KHz. Alternatively, these communications channels may use phase shift keying (PSK) with similar frequencies and bandwidths. In known systems, as shown in FIGS. 2 and 3, the bandwidth is significantly limited because of the continuous length of the twisted pair bus 44.

Each external device 48 is attached to the streamer cable by means of a rotating collar (not shown) which allows the device to swivel around the circumference of the cable but keep the device internal coil 49 positioned properly relative to the cable internal coil 47. Thus, each external device 48 communicates with the streamer cable by electromagnetic coupling between the coils 47 and 49.

Figure 4A:
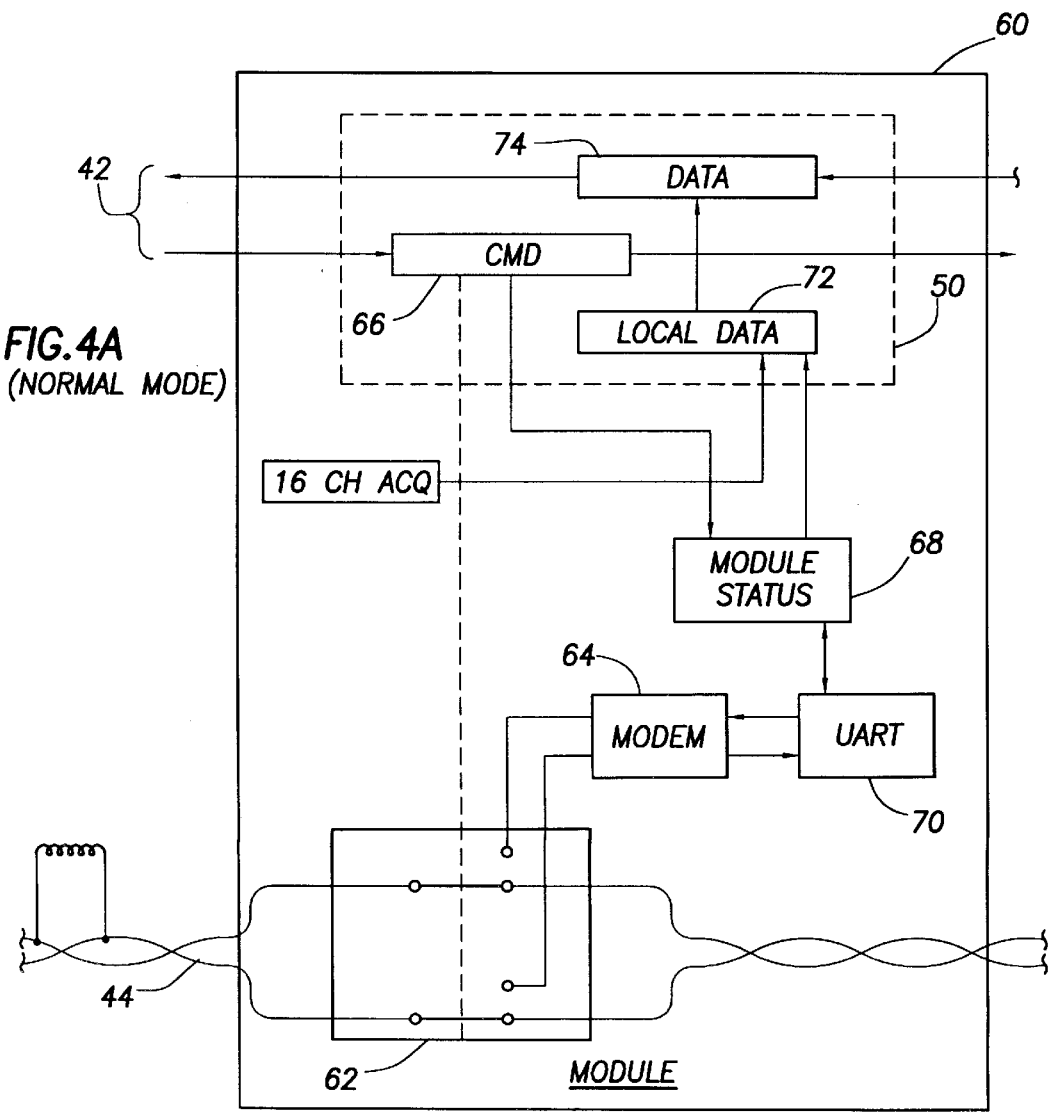
FIG. 4A is a schematic drawing of an improved module of the present invention, operating in the conventional mode.
Figure 4B:
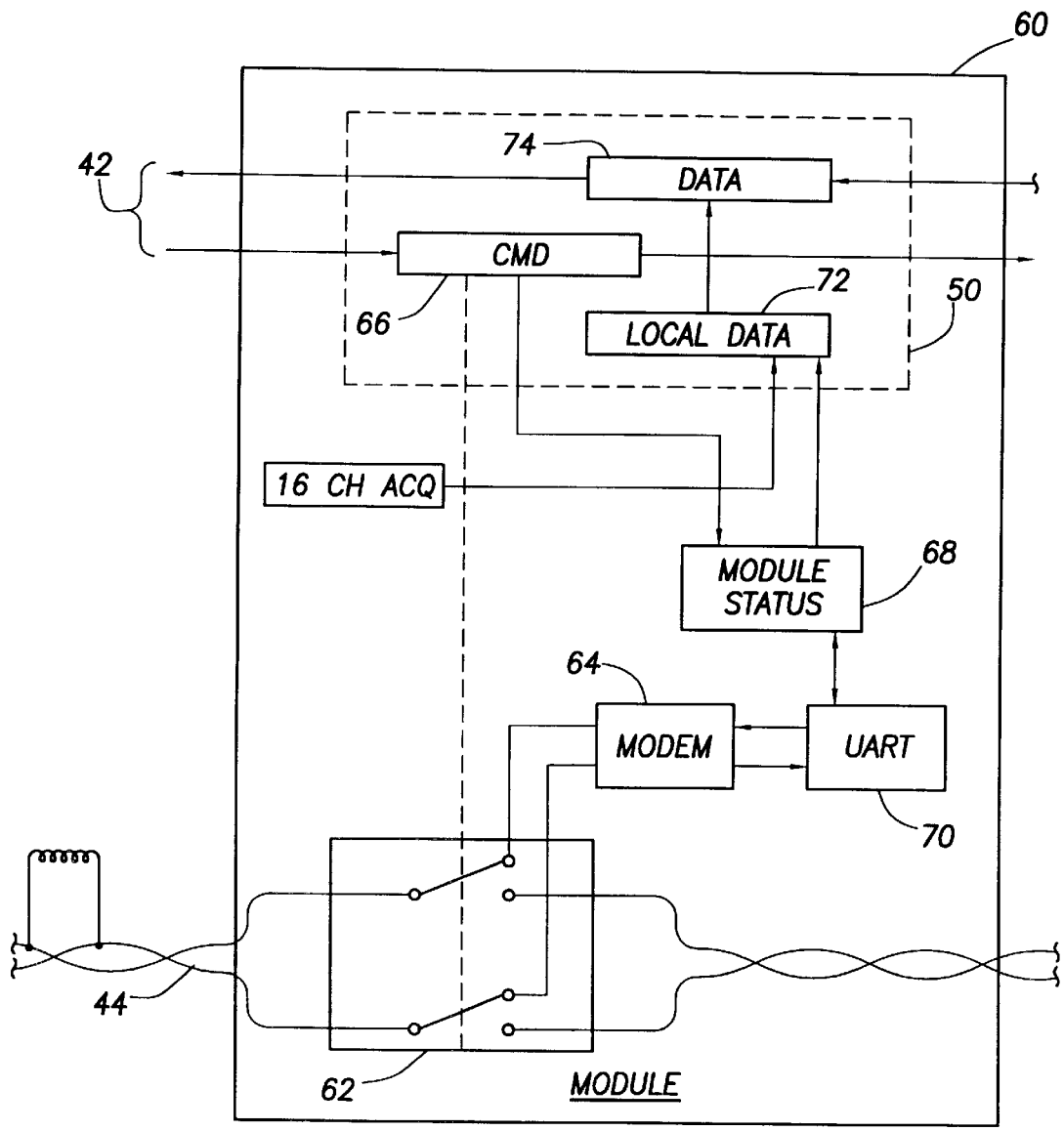
FIG. 4B is a schematic drawing of an improved module of the present invention, operating in an enhanced mode.

As shown in FIGS. 4A and 4B, the present invention thus provides communication between the twisted pair bus 44 and the seismic data telemetry 42 within an improved module 60. The module 60 is adapted to be installed in existing systems, to save on retrofit costs, while providing enhanced operating capability as the system to which it is attached is upgraded. This permits usage of currently installed equipment, such as the same sections of streamer cable, birds, and other external devices, which provides an advantage to those upgrading seismic exploration systems.

A relay 62 provides two modes of operation. A first mode of operation, shown in FIG. 4A, is referred to as normal or standard mode since, in this mode, the improved module 60 operates in the same mode as module 46, with the twisted pair bus 44 passing through the module 60 with no communication with the other circuits in the module. Upon loss of power, the relay 62 fails to the position depicted in FIG. 4A.

In the enhanced mode, shown in FIG. 4B, the relay 62 is switched and the signal on the twisted pair bus 44 is fed into a modem 64. In this mode of operation, other modifications to the electronics on the vessel for controlling, receiving, and transmitting data are required in order to handle the alternate data paths in the normal and enhanced modes of operation. The modifications are described below, in greater detail.

The relay 62 is controlled by a command module 66. If the command module 66 loses power or receives "off" logic, the relay 62 is also non-energized (i.e., normal mode). This is accomplished by selecting a relay with the normally closed contacts used for normal mode, and power for the relay is taken from circuit power.

In addition, the command module 66 interprets signals coming from the vessel 40 (See FIG. 2). If the signal to operate in the enhanced mode is sent from the vessel, then the relay 62 is energized. Likewise, a command to operate in the normal mode causes the relay to be non-energized.

The advantage to this is that power loss, or the seismic telemetry system not being available or malfunctioning, will not fully disable the external device system, since the external devices are normally battery equipped. The external device system can operate in a conventional manner with conventional equipment until such time as the cable is again powered and commands sent to operate in the enhanced mode.

In FIG. 4B, the relay 62 is shown energized and thus the module 60 is in the enhanced mode. Now in the enhanced mode, each segment of the twisted pair bus between modules 60 is isolated from all other similar segments of the twisted pair. Now each module 60 has a relatively short, dedicated bus coupling the module 60 with a dedicated external device 48. Operation of the streamer cable is more reliable in this mode, since the any fault such as a short in any one segment of the cable will not effect any other such segment. Fault isolation along the streamer is also much easier in this mode.

Each module 60 now assumes responsibility for relaying communications to and from the external devices 48 located on its local segment of the twisted pair bus 44. Because the module 60 has high speed communications optimized for large amounts of data (typically 14 megabits per second), sending single bytes at the rates required by the external devices 48 (2400 bits per second) can be handled as subchannels. Each byte of data sent by the vessel to a particular external device is sent to all modules 60 over the seismic data telemetry line 42. Each module simultaneously receives the data in its command module 66, sends it to a module status/control unit 68, which in turn sends the data to a Universal Asynchronous Receiver/Transmitter (UART) 70. In general, the UART 70 receives a byte of data from an input/output (I/O) bus such as the module status/control unit 68 at computer or system clock speed, then at a much slower speed it sends a start bit, a number of bits of data, and a stop bit to the switch via the modem 64. UARTs are well known in the art, such as an Intel 16550, and may also be found embedded in a microprocessor or implemented in the firmware of a microprocessor. The serial output of the UART is set to the 2400 bits per second of the external device 48 and sent to the modem 64. The modem takes the serial data and drives the twisted pair in the preferred modulation scheme. This scheme may be FSK as described above.

The external device 48 receives this data in a conventional manner. Upon receiving a recognized message in the form of a sequence of bytes, the external device can be commanded to carry out a specified function or send back data. Specifically, these devices are addressable so that broadcast messages can address a single device on any bus.

For data flow in the other direction, data sent from the external device 48 is received by the modem 64, converted to a digital serial data stream, and decoded to bytes by the UART 70. The UART 70 receives data one bit at a time until the entire byte is assembled. It then generates an interrupt to the seismic data telemetry portion of the system so the system will read the new data from the UART. The byte is communicated to the local data transmitter unit 72 via the module status/control unit 68. The local data transmitter unit 72 is then responsible for embedding the 2400 baud data into the 14-megabit per second stream to the vessel via a data unit 74.

Since data packets are identifiable as to which module 60 originated them (so that the seismic data can be correctly mapped), the data corresponding to external devices 48 may also be inferred.

The concept that there are multiple parallel paths back to a recorder in the 20–60 modules of the system allows external devices to communicate back to the vessel in parallel, a significant improvement over existing systems. By broadcasting a global message. i.e., one addressed to all devices, all devices can be made to transmit back simultaneously or in groups. For example, one may have one bird and one compass associated with each module local bus, i.e., a segment of the twisted pair bus 44. In a typical system of 40 modules, a group of 40 birds can first be interrogated as to depth, then a group of 40 compasses can be interrogated as to heading. In a conventional system, this would take 80 separate commands to interrogate to 80 devices and wait for 80 replies in sequence due to the shared nature of the long bus 44 of FIGS. 2 and 3.

The above description describes the basic operation of the preferred form to the invention. The present invention is also adaptable to different lengths of cable, distance between modules, and lengths of the short bus, for greater flexibility of an entire streamer system. In place of a conventional seismic data bus, a fiber optic or other telemetry means with greater band width may be used, since a large number of external devices may be transmitted to and/or received from in parallel. Also, with a properly implemented multiplexing scheme or different modulation schemes, different bit rates for seismic telemetry and external device communication telemetry may be used.

As new external devices are developed, the present invention provides the capability to incorporate the new developments into existing streamers having this invention installed. Different modules having alternate embodiments may be included which allow introduction of auxiliary data to be transmitted between the vessel different types of external device.

By segmenting the twisted pair bus into small lengths, it becomes feasible to couple external devices directly to the bus, rather than through coils as in the current state of the art. This invention is also applicable to seismic cable telemetry systems other than marine, such as land and/or ocean bottom cables. Furthermore, cable data other than seismic may be handled where low speed auxiliary data may be added to an existing high speed data stream.

As previously mentioned, certain modifications to the controller aboard the vessel or elsewhere are required to accommodate this invention. In the current state of seismic arts, systems generally employ multiple streamers (i.e. up to 16) and bird lines sometimes go to gun strings. Bird manufacturers such as Syntron, Digicourse generally furnish "controllers" aboard the vessel which are computers equipped with multiple modem ports, one port for each streamer/bird line that the controller may communicate with. A modem port consists of a modem and UART which, for outbound commands from the computer to the external devices, serialize and encode the data as previously described. For inbound data, the data is decoded, deserialized, and communicated to the CPU of the controller. The CPU responds to user commands and forwards specific setup commands to the external devices. Periodically, the CPU sends query commands to the external devices and receives data in reply from the devices indicating heading, depth, wing angle, and acoustic transit times. The data is processed and forwarded to navigation systems and logging devices. There is also a local screen display on the vessel, generally graphical with selectable views to report this information.

Known seismic recorders issue commands and receive data from individual streamers. The data is serial but transmitted at much higher data rates than the data on bird lines. Therefore, the commands and data must be repeated at intervals along the streamer such as intervals between modules. The recorder receives a complex set of serialized data, consisting of preamble, data, source address, error checking information, as well as module information such as internal temperature, pressure, power supply voltage and current, and serial number. Frequently, this information is sent in a multiplexed format where the data may span a period of time.

In the present invention, bytes to and from external devices just become another piece of information multiplexed into the complex stream of data already being sent to and received from the modules. The logic circuits and processors contained within the recorder process the incoming streamer complex data stream and extract the various parts and direct them to the correct destination. In practice, one may buffer an entire message (a combination of, for example, 4 to 32 bytes from an external device) from each module into temporary memory. Then, the completed message can be forwarded to the controller via a network link (i.e. ethernet 10Base-T) for processing of content. This requires the controller to accept ethernet input and the input to be substituted for the modem port output. Likewise, by sending outbound commands to the recorder, the recorder would embed these commands into the outgoing streamer command signal. Both the modem ports and the ethernet connection may be retained to facilitate using either normal mode or enhanced mode, respectively. The detection of ethernet data or modem data is handled automatically in this arrangement.

A part of the recorder may also be programmed to process external device data and display the data on the screens normally used for streamer information, thus replacing the controller. The recorder forwards data to navigation and logging systems, and periodically sources the query commands.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A system to control and monitor external devices external to a seismic cable behind a vessel and wherein each of the devices is connected to the cable through an associated magnetic coil coupling, the system comprising:
   a. a plurality of seismic data telemetry conductors, each of the plurality of seismic data telemetry conductors comprising
      i. a command line outbound from the vessel, and
      ii. a data transmission line inbound toward the vessel;
   b. a plurality of modules, with one of the plurality of modules between each of the plurality of data telemetry conductors;
   c. a plurality of control conductors, each control conductor providing control to one of a plurality of devices external to the seismic cable, wherein each of the plurality of control conductors is coupled to an associated module; and
   d. a switch in each of the plurality of modules to selectively connect one of the plurality of control conductors to an associated data telemetry conductor.

2. The system of claim 1, wherein the switch in each of the plurality of modules receives operational power from an associated control conductor.

3. The system of claim 2, wherein the switch in an unpowered condition connects control conductors in series.

4. The system of claim 1, wherein the seismic cable is a marine seismic streamer.

5. The system of claim 1, further comprising a modem selectively coupleable between a control conductor and a seismic data telemetry conductor by a switch.

6. The system of claim 5, further comprising a command unit in each module.

7. The system of claim 6, wherein the command unit operates to control the position of the switch.

8. The system of claim 6, further comprising a module status/control unit coupled to the command unit to receive communications from the command unit directed to an external device.

9. The system of claim 8, further comprising an asynchronous receiver/transmitter coupled between the module status/control unit and the modem to manipulate data configuration between one of the plurality of seismic data telemetry conductors and an external device.

10. The system of claim 1, wherein the switch is further adapted to selectively connect control conductors in series.

11. The system of claim 1, further comprising an electromagnetic coil coupled to each of the plurality control conductors to communicate with each of the external devices.

12. A method of controlling an external device external to a seismic cable, the external device connected to the cable through an associated magnetic coil coupling, the cable having a seismic data telemetry cable and a control conductor in communication with the seismic data telemetry cable, comprising the steps of:
   a. selectively and reversibly segmenting the control conductor to isolate the external device from all other external devices external to and electrically coupled to the seismic cable; and
   b. sending a command signal to the external device through the seismic data telemetry cable.

13. The method of claim 12, further comprising the steps of:
   a. receiving the command signal from the seismic data telemetry cable into an asynchronous receiver transmitter in byte form;
   b. configuring the byte form command signal into a serial form signal; and
   c. transmitting the serial form signal to an external device through a modem.

14. The method of claim 12, further comprising the steps of:
   a. receiving a communication signal from an external device in serial form;
   b. configuring the serial form signal into byte form; and
   c. transmitting the byte form signal to the seismic data telemetry cable.

15. The method of claim 12, further comprising the step of selectively and reversibly connecting the segmented control conductor in series.

16. A system for controlling a device external to a seismic cable having a seismic data telemetry cable and a control conductor in communication with the seismic data telemetry cable, the system comprising:
   a. a segmented control conductor which isolates the device from other devices external to and electrically coupled to the seismic cable; and
   b. means for conducting a command signal to the external device from the seismic data telemetry cable.

17. The system of claim 16 wherein the means for conducting a command signal further provides means for conducting data from the external device to the seismic data telemetry cable.

18. The system of claim 16 wherein the means for conducting a command signal to the external device comprises a modem and a universal asynchronous receiver/transmitter between the seismic data telemetry cable and the external device.

* * * * *